US008264537B2

(12) United States Patent
Westrick et al.

(10) Patent No.: US 8,264,537 B2
(45) Date of Patent: Sep. 11, 2012

(54) PHOTOGRAMMETRIC NETWORKS FOR POSITIONAL ACCURACY

(75) Inventors: William A. Westrick, Fort Wayne, IN (US); Elena V. Apter, Fort Wayne, IN (US)

(73) Assignee: The Mainz Group LLC, Fort Wayne, IN (US)

( * ) Notice: Subject to any disclaimer, the term of this patent is extended or adjusted under 35 U.S.C. 154(b) by 1293 days.

(21) Appl. No.: 11/864,515

(22) Filed: Sep. 28, 2007

(65) Prior Publication Data

US 2009/0086020 A1    Apr. 2, 2009

(51) Int. Cl.
*H04N 7/18* (2006.01)
(52) U.S. Cl. ......................................... 348/140; 348/169
(58) Field of Classification Search .................. 348/115, 348/135, 140, 169; 382/154, 100
See application file for complete search history.

(56) References Cited

U.S. PATENT DOCUMENTS

| 5,606,627 | A | * | 2/1997 | Kuo | 382/154 |
| 6,222,482 | B1 | | 4/2001 | Gueziec | |
| 6,674,892 | B1 | * | 1/2004 | Melen | 382/154 |
| 6,707,487 | B1 | | 3/2004 | Aman et al. | |
| 6,928,366 | B2 | | 8/2005 | Ockerse et al. | |
| 7,421,334 | B2 | | 9/2008 | Dahlgren et al. | |
| 7,860,269 | B2 | * | 12/2010 | Gal et al. | 382/100 |
| 2001/0055063 | A1 | * | 12/2001 | Nagai et al. | 348/116 |
| 2004/0085443 | A1 | * | 5/2004 | Kallioniemi et al. | 348/135 |
| 2009/0087013 | A1 | | 4/2009 | Westrick | |
| 2009/0169096 | A1 | * | 7/2009 | Cipolla et al. | 382/154 |
| 2010/0002077 | A1 | * | 1/2010 | Viggiano et al. | 348/115 |

OTHER PUBLICATIONS

Written Opinion of the International Searching Authority for PCT/US2008/077972, Jan. 22, 2009, 6 pages.

* cited by examiner

*Primary Examiner* — Jungwon Chang
(74) *Attorney, Agent, or Firm* — Faegre Baker Daniels LLP

(57) ABSTRACT

The present invention involves a surveying system and method which determines the position of a object point using two images. First, at least two reference points appearing on the two images are correlated. Then the position of the object point is determined based on the two images and the two reference points.

20 Claims, 15 Drawing Sheets

PHOTOGRAMMETRIC NETWORKS FOR POSITIONAL ACCURACY

BACKGROUND OF THE INVENTION

1. Field of the Invention

The invention relates to position determining software. More specifically, the field of the invention is that of visual survey system software for enhancing the accuracy of visual survey systems in real time applications.

2. Description of the Related Art

The approaches described in this section could be pursued, but are not necessarily approaches that have been previously conceived or pursued. Therefore, unless otherwise indicated herein, the approaches described in this section are not teachings or suggestions of the prior art to the claims in this application and are not admitted to be prior art by inclusion in this section.

There is increasing need for systems that can map transportation infrastructure to ever higher levels of accuracy. Highly accurate survey map data may be used for lane departure warning systems on highways, corridor clearance in transportation systems, and vehicle automation in general with particular application to detection of pavement surface difference for condition assessment and to automated roadway foreign object detection. As vehicular automation, robotic applications, and transportation electronic infrastructure evolve, further use of visual survey systems will be needed.

The purpose of a surveying system is to record the absolute position/orientation of objects that can be seen in imagery taken from survey vehicles. To do this, the survey vehicle must accurately record its own absolute position/orientation and it must be able to attain the relative position/orientation of the target object. It can then calculate the absolute position/orientation of the target object to within the combined errors of the absolute and relative systems.

To achieve this, the survey vehicle has several instruments designed to record the position and orientation of itself and the objects around it. The vehicle travels through the survey area capturing and recording the data from the sensors at specified time or distance intervals. That is, at particular moments, the cameras, GPS, INS, and other instruments capture their readings.

Once data is collected for the survey, it is used to extract information about the survey area. Objects visible in particular images can be located by correlating the capture point data to the image. Other information about the objects can be extracted such as sign types, road markings, centerlines, and other visible attributes.

However, known systems have measurement error because of the physical limitations of the survey systems. While accurate in many respects, there are situations where enhanced accuracy is desired.

SUMMARY OF THE INVENTION

The present invention involves a positional computation system and method for surveying system which minimizes the potential error in the calculation of location information. A feedback technique using data captured by the survey system corrects the determination of relative position of nearby survey capture points. This will primarily use the imagery data from the survey; however the technique in general is not limited to this type of data. These nearby relative corrections may be used to create a "rigid" mesh over the entire survey. This mesh may be used to correct the survey as a whole by pinning it to points with known low error or by allowing averaging over greater sample sets.

The present invention, in one form, relates to a surveying system for determining the location of a object point from images. Two image gathering devices are coupled at a known relative distance, and each image gathering device is adapted to generate an image. A location calculator has a plurality of instructions enabling the location calculator to correlate at least two reference points appearing on the two images, and to determine the position of the object point based on the two images and the at least two reference points.

The present invention, in another form, is a method for determining the postion of a object point using two images. The first step is correlating at least two reference points appearing on the two images. The next step is determining the position of the object point based on the two images and at least the two reference points.

The method mitigates against the multiplication of errors through the several measurements by an incremental type of calculation, deriving relatively accurate reference points which are subsequently used for determining the location of the object point.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
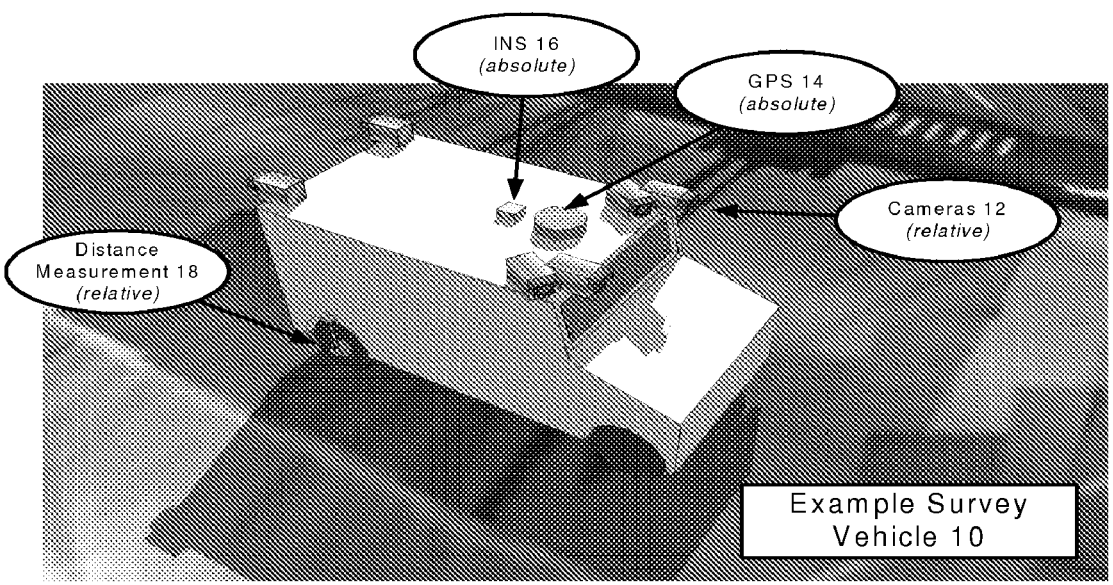
FIG. 1 is a perspective view of an example survey vehicle.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects. Objects may also be invoked recursively, allowing for multiple applications of an objects methods until a condition is satisfied. Such recursive techniques may be the most efficient way to programmatically achieve a desired result.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. The computers have at least one processor for executing machine instructions, and memory for storing instructions and other information. Many combinations of processing circuitry and information storing equipment are known by those of ordinary skill in these arts. A processor may be a microprocessor, a digital signal processor ("DSP"), a central processing unit ("CPU"), or other circuit or equivalent capable of interpreting instructions or performing logical actions on information. Memory includes both volitile and non-volatile memory, including temporary and cache, in electronic, magnetic, optical, printed, or other format used to store information. Users activate computer programs or network resources to create "processes" which include both the general operation of the computer program along with specific operating characteristics determined by input variables and its environment.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data ("CDPD") used on the Advance Mobile Phone Service ("AMPS").

The terms "wireless application protocol" or "WAP" mean a universal specification to facilitate the delivery and presentation of web-based data on handheld and mobile devices with small user interfaces. The term "GPS" means Global Positioning System. The term "INS" means Inertial Navigation System. The term "object," when not used in its software programming definition, means the target for which the location or position is being obtained.

Figure 2:
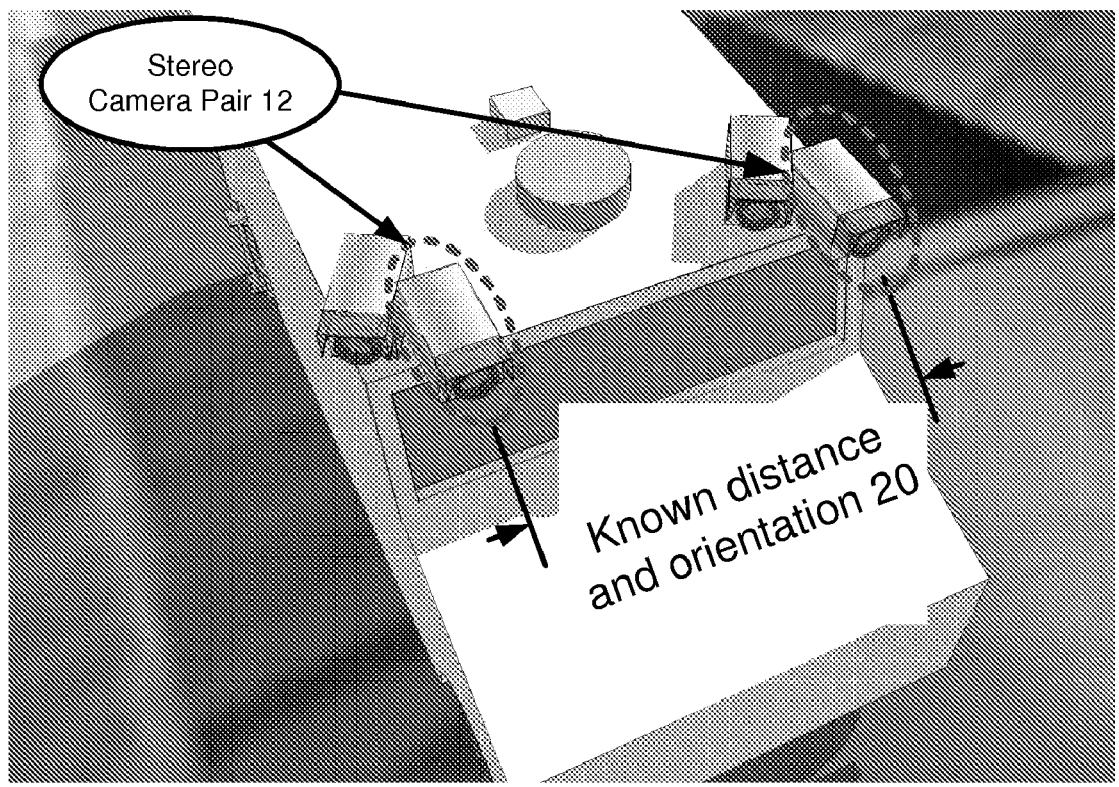
FIG. 2 is a perspective view of the stereo camera pair of FIG. 1.

The exemplary embodiment disclosed herein relates to vehicle 10 with two cameras 12 located fixed distance 20 relative to each other, see FIGS. 1 and 2. The sensing involved is visual sensing and the methods disclosed directly relate to visual image processing. However, other embodiments of the invention may use other sensory devices and work with different data in a similar manner to accomplish the error minimization of the present invention.

In the exemplary embodiment, the camera is the primary instrument for determining the relative position and orientation of objects to survey vehicle 10. A single image can be used to determine the relative direction to the object, however two images at a know distance and orientation are needed to determine the relative distance to the object. Other sensory instruments, e.g., sonar, radar, ultrasound, may alternatively be used in the appropriate circumstances. In this exemplary embodiment, cameras 12 that take these images are referred to as a stereo pair. Since cameras 12 are fixed to survey vehicle 10, their orientation and distance to each other is measured very accurately.

Figure 3:
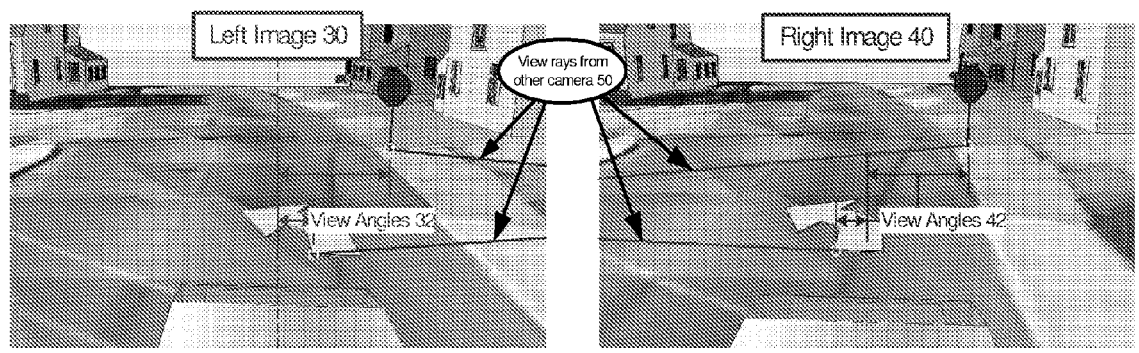
FIG. 3 is a left and right image view of a possible image from the stereo camera pair of FIG. 2.
Figure 4:
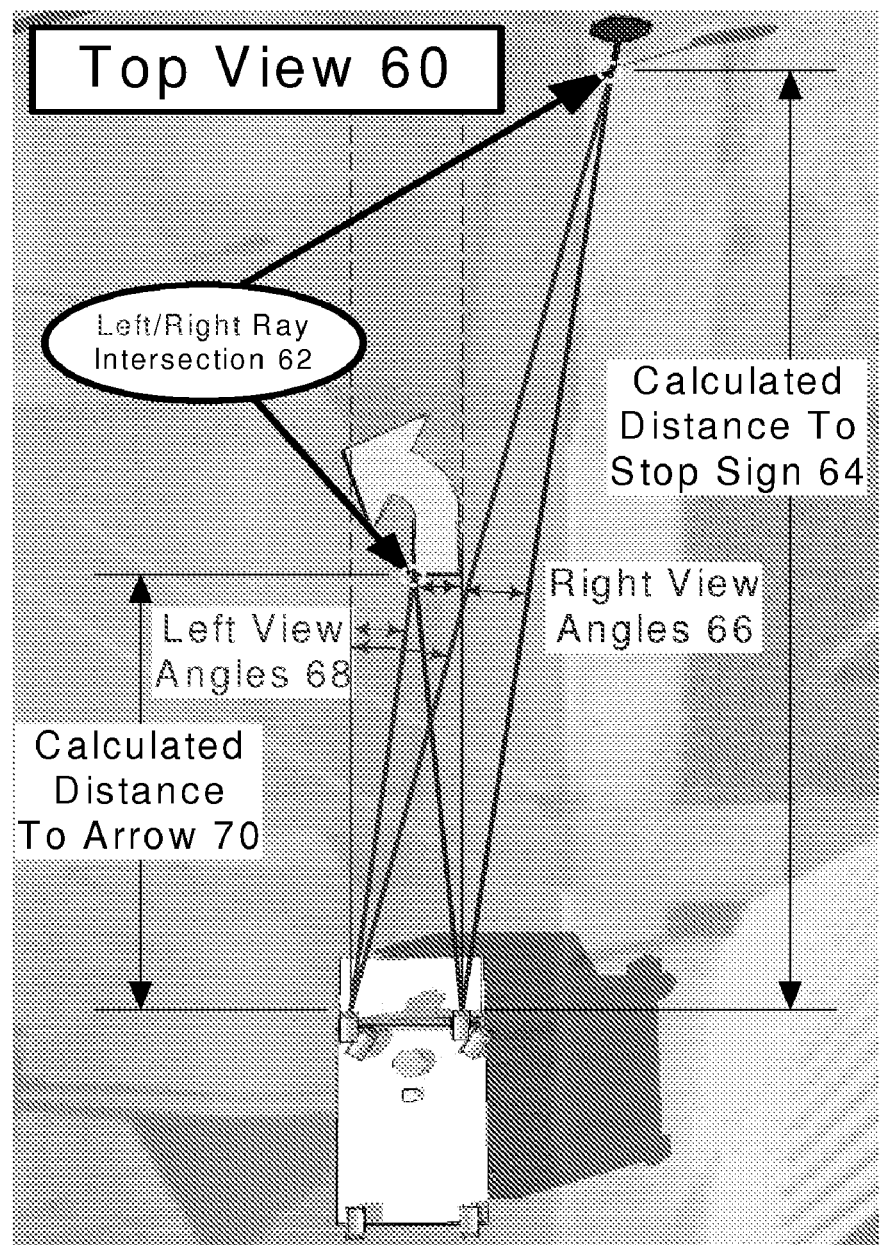
FIG. 4 is a top plan view of stereo camera pair in relation to a viewed scene.
Figure 5:
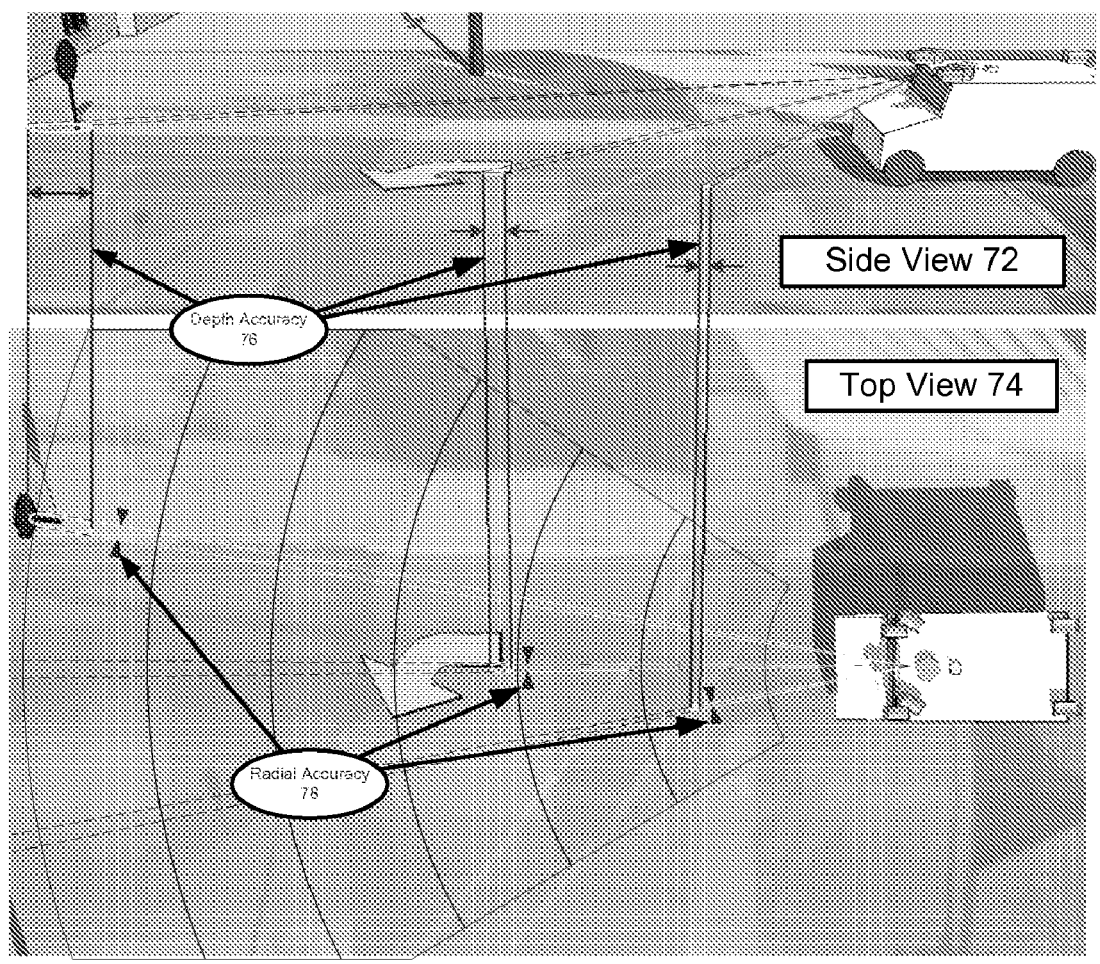
FIG. 5 is a top and side view of the arrangement of FIG. 4.

The two images (e.g., left image 30 and right image 40 of FIG. 3) taken by stereo pair 12 work together to determine the location of the objects they see. The intersection of the viewing rays 50 from left and right cameras 12 are used to calculate the distance and orientation from vehicle 10, see FIGS. 4 and 5. Since the orientation and geometry of each camera 12 is known, the angle of an object (left/right and up/down) may be determined (e.g., view angles 32 and 42). This combined with the calculated distance may be used to determine the relative three dimensional position of the object in the images.

The survey system determines the absolute vehicle position and orientation. GPS 14 records the position of the vehicle, specifically recording the latitude, longitude, and altitude of the survey vehicle in the exemplary embodiment. INS 16 measures the direction and orientation of survey vehicle 10. In this way survey system 10 may know where it was and the direction it was facing when a set of images was taken.

Figure 6:
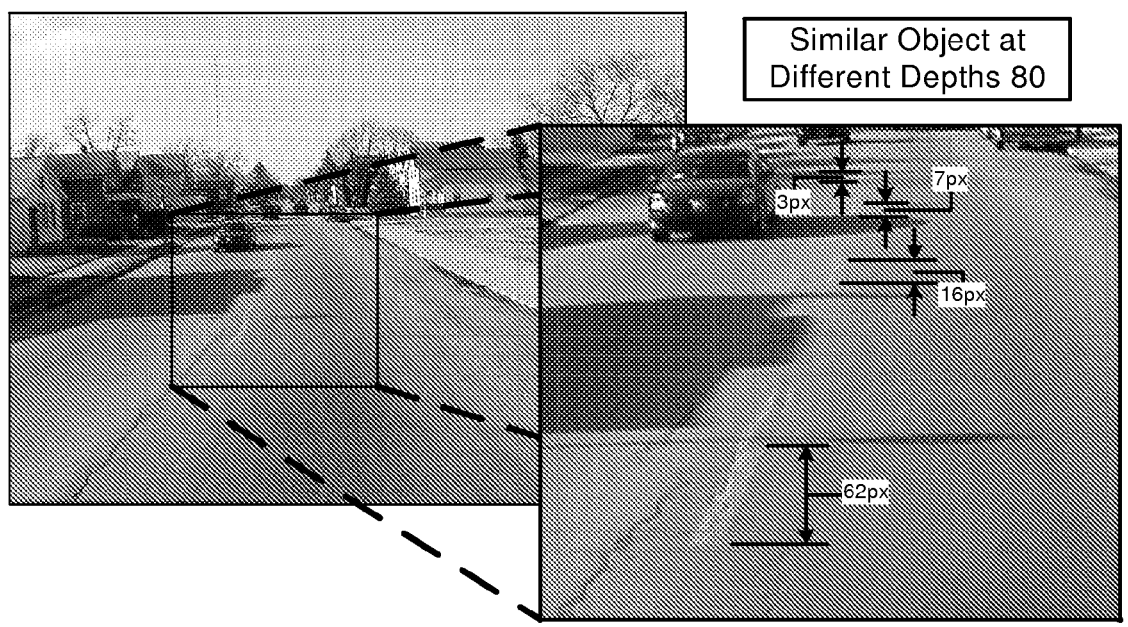
FIG. 6 is a dual view of a similar object having different depths.

Known systems have relative accuracy (vehicle to object) which is very good. This is because it relies on the physical geometry of the survey vehicle and can be measured and calibrated to a high degree of certainty. However, distance from the survey vehicle decreases the accuracy. Objects further from the survey vehicle appear smaller in the imagery and thus consume fewer pixels. As an example of this fact, FIG. 6 shows several sizes of stripes on the images, whereas each stripe on the road is actually the same size. The stripes that are further from the survey have less resolution, therefore their relative position is less accurately known.

Both radial and depth determination are needed for survey systems. Radial determination (relative angle or direction to a point) may be determined with a single image; and when combined with the radial determination from the other image of a stereo pair radial accuracy increases slightly. The accuracy of the radial determination decreases with distance but it does so linearly. Depth determination (relative distance to a point) requires both images in the stereo pair. Because of this depth determination accuracy is at best half of the radial accuracy. Depth accuracy also decreases geometrically over distance. This is due to the decreasing angle of incident between the two images and between the survey vehicle and the ground. As such, depth determination accuracy decreases much more rapidly than does radial determination over distance.

Survey systems often need to be reliable in terms of Absolute Accuracy (GPS location and heading). The absolute accuracy of the survey vehicle is based primarily on two devices. GPS 14 primarily determines the position (latitude, longitude and altitude) of the survey vehicle, and INS which determines the direction the survey vehicle is facing. The INS also assists the GPS by recording changes to the vehicle position and orientation.

Figure 7A:
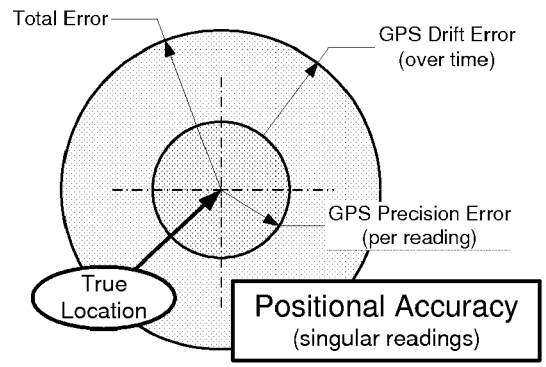
FIGS. 7A-C are schematic diagrams illustrating positional accuracy errors.
Figure 7B:
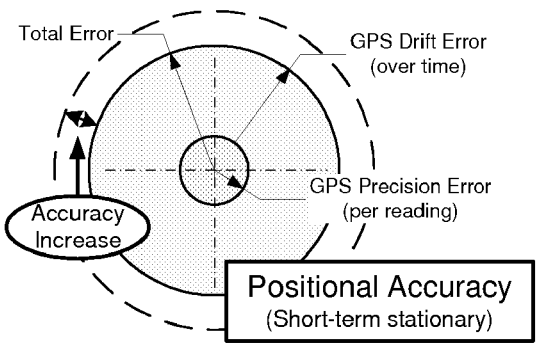
Figure 7C:
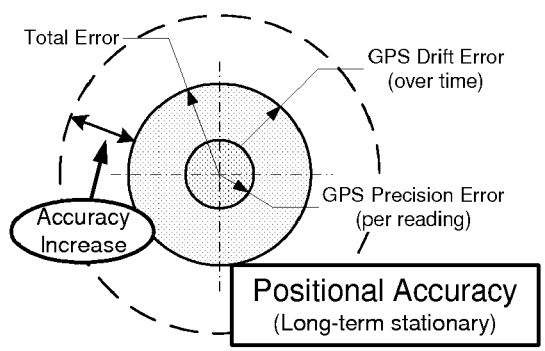

The accuracy of GPS relies on its precision and on GPS drift, see FIGS. 7A-C. Precision is the short-term repeatability. Drift is the error caused by atmospheric conditions and other ambient factors. GPS units can be very accurate when given time to fix on a point. By averaging readings over a short period while stationary, precision error can be reduced. If a survey vehicle were to stop and not move for a several minutes, its location may be determined to a higher degree of accuracy. This however is not practical for a mobile survey application.

Likewise, drift error may be reduced by monitoring trends over a long period of time. To do this the unit must be stationary as well. But, in many cases, a second stationary GPS unit may be used to record these drift trends which are then applied to the mobile survey data. Theoretically, the second GPS unit is affected by the same ambient condition as mobile unit. Using a second GPS unit does not eliminate all drift, as there will be differences between the ambient conditions experienced by the two units that are compounded by their distance.

Figure 8:
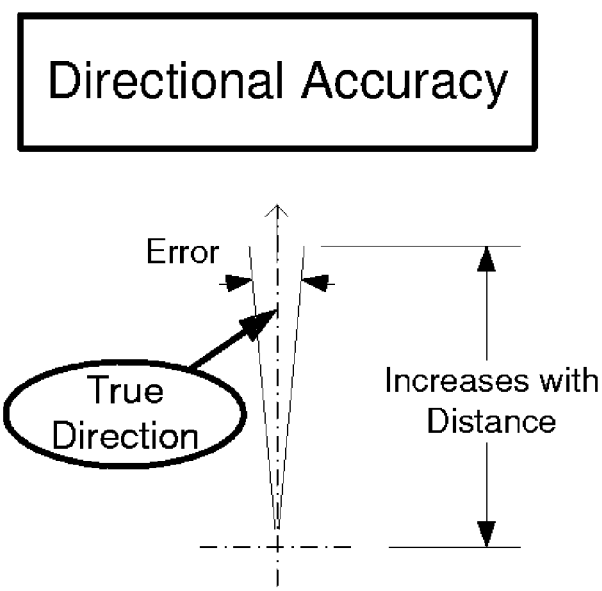
FIG. 8 is a schematic diagram illustrating directional accuracy error.

Directional accuracy is the error in determining the orientation of the vehicle, see FIG. 8. When used to determine the location of objects near the vehicle, this error is multiplied over distance. A two degree error will cause an object 3 meters away to be miscalculated by about 10 centimeters. But an object 30 meters away would be off by more than a meter. Thus there are several areas where measurement and calculation error may introduce significant error in absolute object position determination. When determining the surveyed position of an object in question, relative and absolute errors are combined. Currently the system used for determining the absolute position of the survey vehicle is essentially separate from the system used to locate the objects relative to the vehicle. In this system, the error follows the form:

$$\epsilon = p_\epsilon + d \cdot \sin(\alpha_\epsilon + \phi_\epsilon) + d^2 l_\epsilon$$

Where...
$\epsilon$ is total error,
$p_\epsilon$ is absolute positional error (precision and drift combined),
$\alpha_\epsilon$ is absolute angular error,
$l_\epsilon$ is relative depth error,
$\phi_\epsilon$ is relative radial error and
d is the distance of the target point from the survey vehicle.

Figure 9:
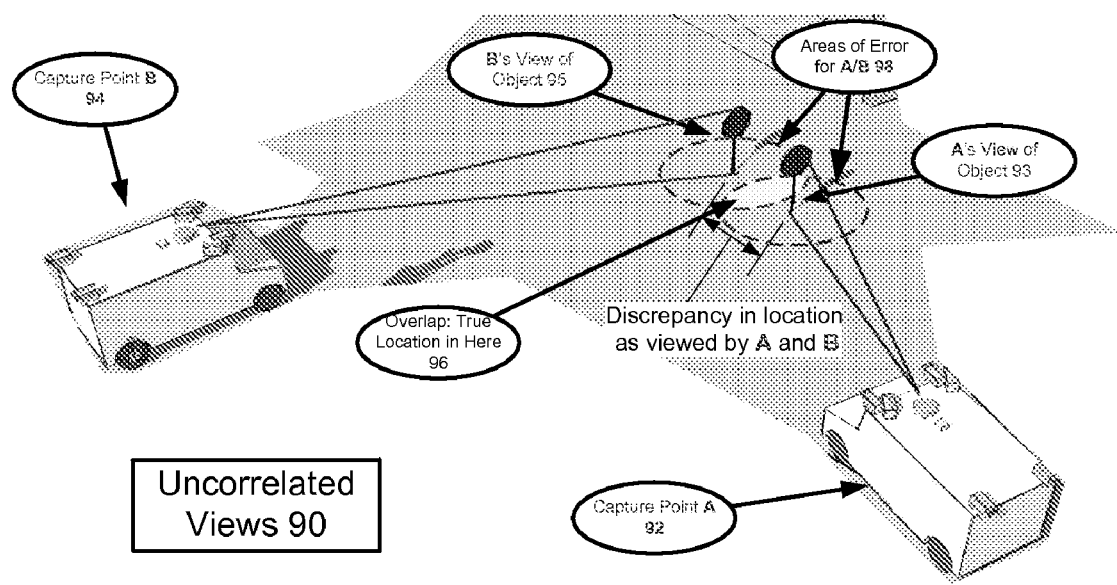
FIG. 9 is a perspective view of uncorrelated views.
Figure 10:
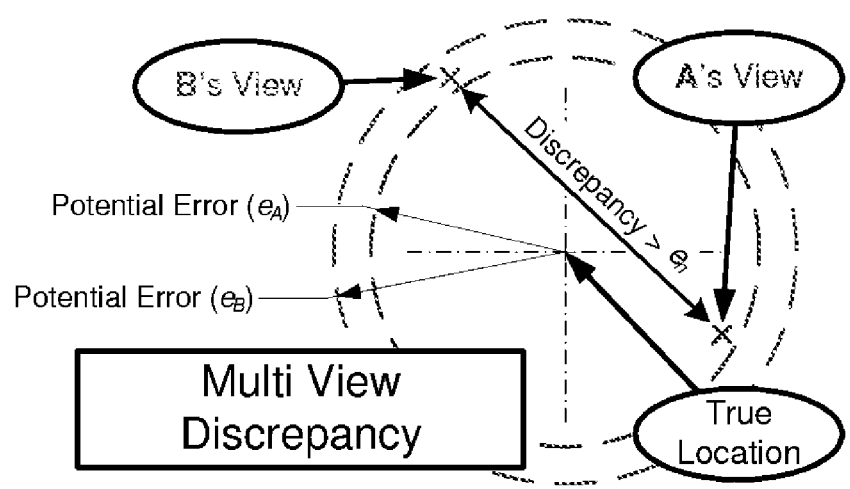
FIG. 10 is a schematic diagram of multiple view discrepancy.

As illustrated in FIGS. 9 and 10, capture points A (92) and B (94) represent survey vehicle 10 at different times and places in the survey. If attempt to extract the sign feature, we will get a different location if we choice A's view or B's view. The discrepancy is as high as the sum of the individual errors ($\epsilon_A + \epsilon_B$).

This potential discrepancy may not only cause confusion, but may make the system seem less accurate than it actually is. For example, say that the location of the object can be determined to within 1 meter. If both views are off a meter in opposite directions, then it will appear that the object is off by 2 meters. This also makes it difficult to map previously located objects within other views since they may not line up from view to view.

In accordance with one embodiment of the present invention, the creation and utilization of a photogrammetric feedback network for survey correction is implemented to achieve more precise location determinations. In the above discussion we showed some accuracy issues and causes with known methods used for image based survey vehicles. The discussion below involves an overall method for increasing the accuracy of the survey and sub methods and techniques that addresses specific aspects of the correction process. Some methods may be optional or there may be alternates with various applications. The techniques are discussed with the goal of increasing the survey accuracy to the point that advanced applications, requiring highly accurate maps, are feasible.

This is accomplished by means of a feedback technique using data captured by the survey system to correct the relative position of nearby survey capture points. This will primarily use the imagery data from the survey; however the technique in general is not limited to this type of data.

These nearby relative corrections may be used to create a "rigid" mesh over the entire survey. This mesh may be used to correct the survey as a whole by pinning it to points with known low error or by allowing averaging over now greater sample sets. Thus, by incrementally decreasing error over specific segments, the total error introduced by the physical systems may be minimized. While this disclosed embodiment describes using one set of reference points to assist in determining the position of the target object, multiple levels of reference points may be used to mitigate against increases in total error, and thusly may resulting in several levels of reference points.

Figure 11:
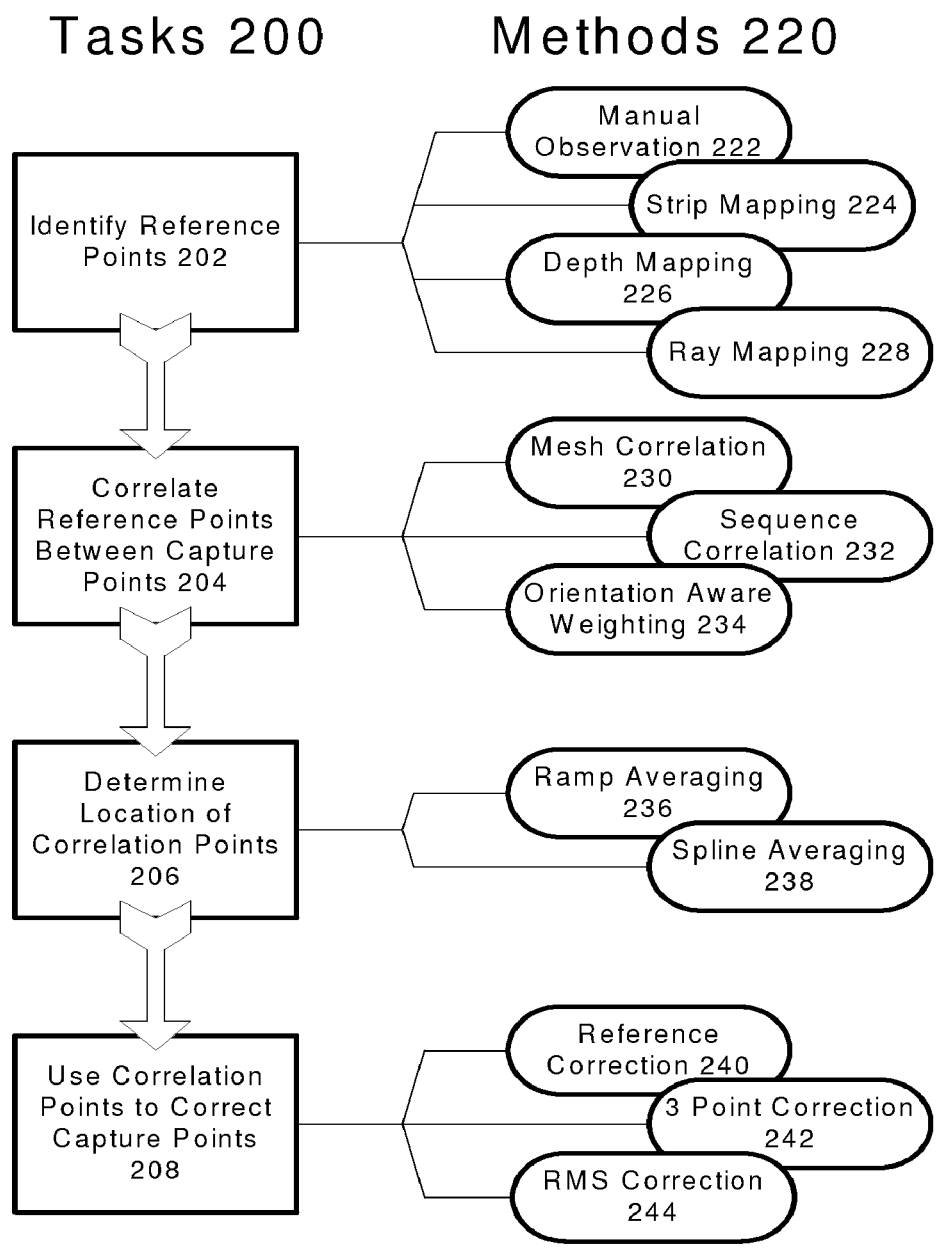
FIG. 11 is a flow chart diagram of a method of one embodiment of the present invention.

FIG. 11 shows the task steps 200 involved in the procedure. Attached to each task are potential methods 220 that may be alternatively employed to achieve the corresponding task step. In general, the first listed method associated with each task involves computations which are the easiest to implement, while the last listed method involves computations which are the most accurate method of the group. However, this rating of tasks does not necessarily exist for every application. At least one method for each task is typically implemented for each task, and tasks may be computationally combined where appropriate. In some cases, a combination of methods for different situations may yield better results.

First in step 222, the survey system identifies points in the survey image that are to be used to orient the capture point data. These points typically represent stationary features that may be identified in other images of the capture point and ideally in the imagery from other nearby capture points as well. Additionally, the relative position of points to the capture point's reference frame must be attainable to within a known radius of error. Basically the reference points lie within the field of view of a stereo pair. A minimum of three (non-collinear) points is required. Possible methods include manual observation 222, strip mapping 224, depth mapping 226, and ray mapping 228. In one embodiment of the invention, ray mapping 228 involves the invention disclosed in the co-pending application Ser. No. 11/864,377, entitled RAY MAPPING, invented by co-inventor Westrick of the present invention, filed on even date herewith, assigned to the assignee of the present invention, the disclosure of which is incorporated by reference herein.

Figure 12A:
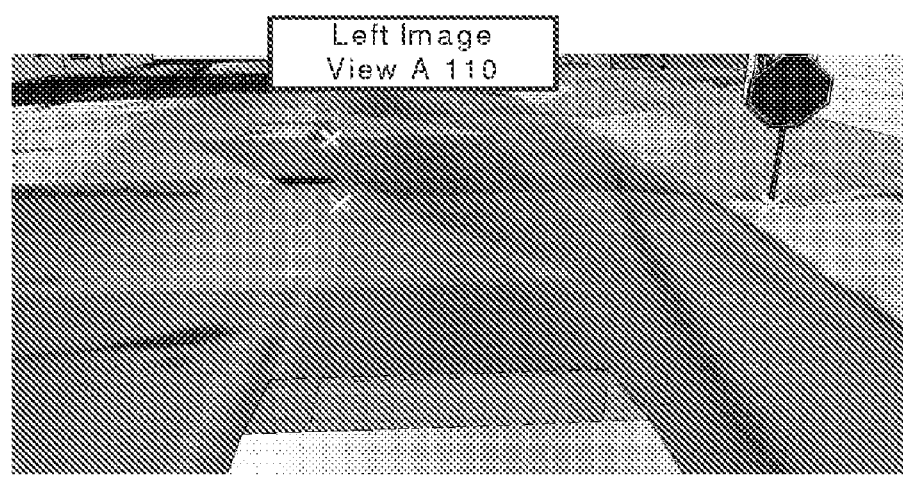
FIGS. 12A and 12B are left and right image views, respectively.
Figure 12B:
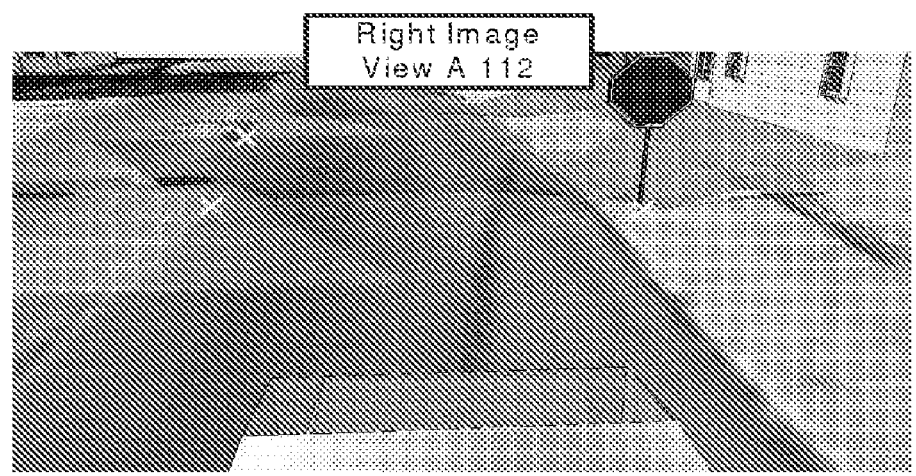

In FIGS. 12A and 12B, some example points are shown from the left and right views 110 and 112, respectively, of capture point A. In this exemplary embodiment, the base of the stop sign, the end double yellow line and the corner of a pavement patch are chosen. Since these are visible and identifiable in both views of the stereo pair, their location may be determined by the survey system. Points on mobile object like other vehicles or shadows that will change later in the day will work for stereo correlation, but are poor choices where images taken at different time may need to be used.

Figure 13:
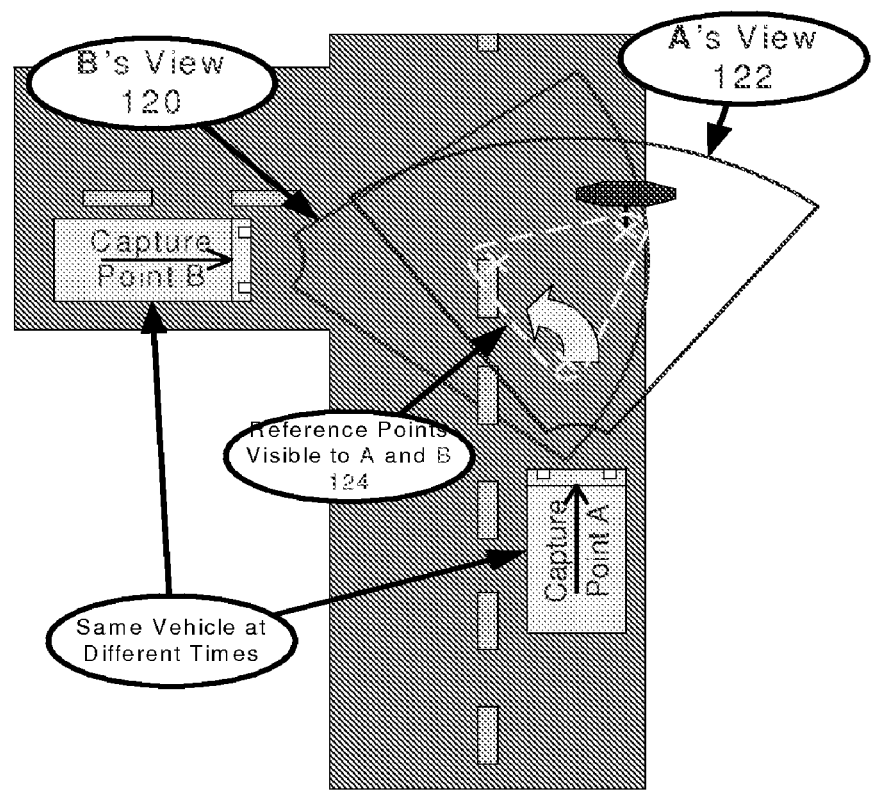
FIG. 13 is a top plan view of correlating reference points.

Next in step 204, these reference points are found and recorded in the views of other capture points (e.g., views 120 and 122 of FIG. 13). This correlation process produces a data table (not shown) that lists all the possible capture point views of each reference point. In FIG. 13, three points 124 identified from capture point A are also visible to capture point B of the survey. In this case all three reference points from A are assigned to each of the same reference points from B. These are the correlated reference points between A and B. Exemplary methods for this step include mesh correlation 230, sequence correlation 232, and orientation aware weighing 234.

Figure 14:
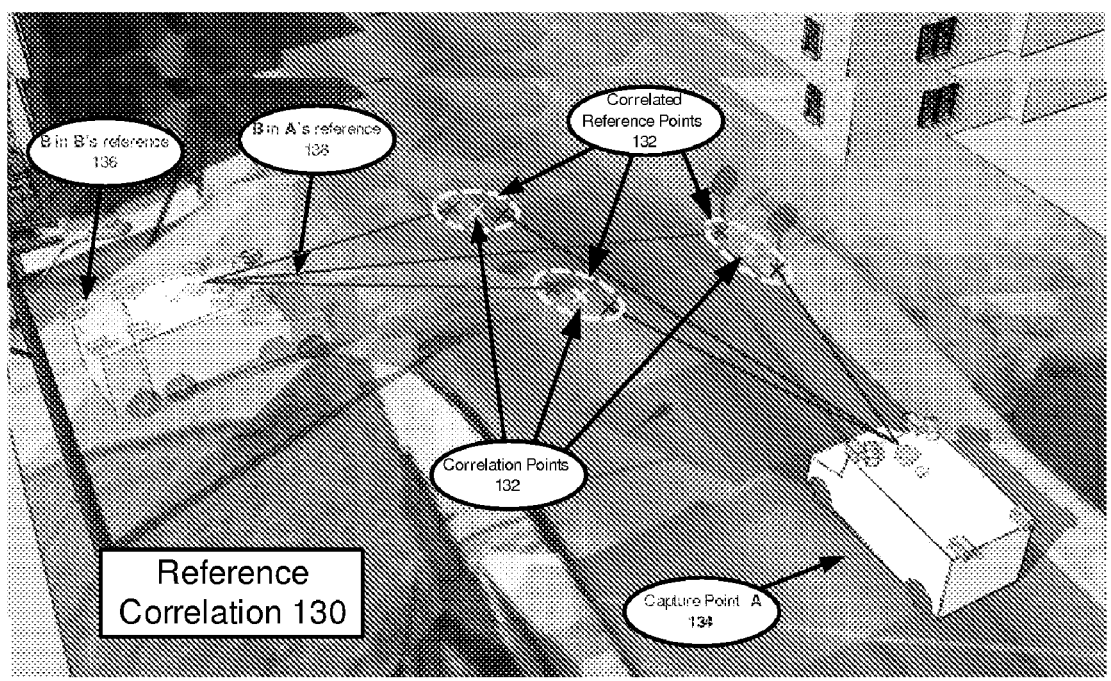
FIG. 14 is a perspective view of a reference correlation.

Because of the errors in the position and orientation of the different capture points, capture point A (132) and B (134) perceive the locations of the correlated reference points differently as shown in FIG. 14. Here the red and blue X's and ghosted images show where capture point A and B have calculated the locations of the reference points. The reference points have been correlated as indicated by the ovals 132. On the left of the image we can see the difference in position and orientation of the B capture point. The ghosted image of the survey vehicle indicates its location based on its own frame of reference and that of capture point A (136, 138).

To determine the best place for the correlation point for each correlated reference, the references associated with each capture point are weighted based on an error function for that point. The weighting factor are used to determine a weighted average point between the references as the correlation point. This is done for all the correlated reference points, for example by ramp averaging 236 or spline averaging 238. Ramp averaging involves a simple interpolation between the two or three closest correctable points, a linear correction or best fit line. For spline averaging, a cubic spline curve fit may be used to adjust the correlation points. This provides for a smoother interpolation and provides better vehicle heading correct.

Figure 15:
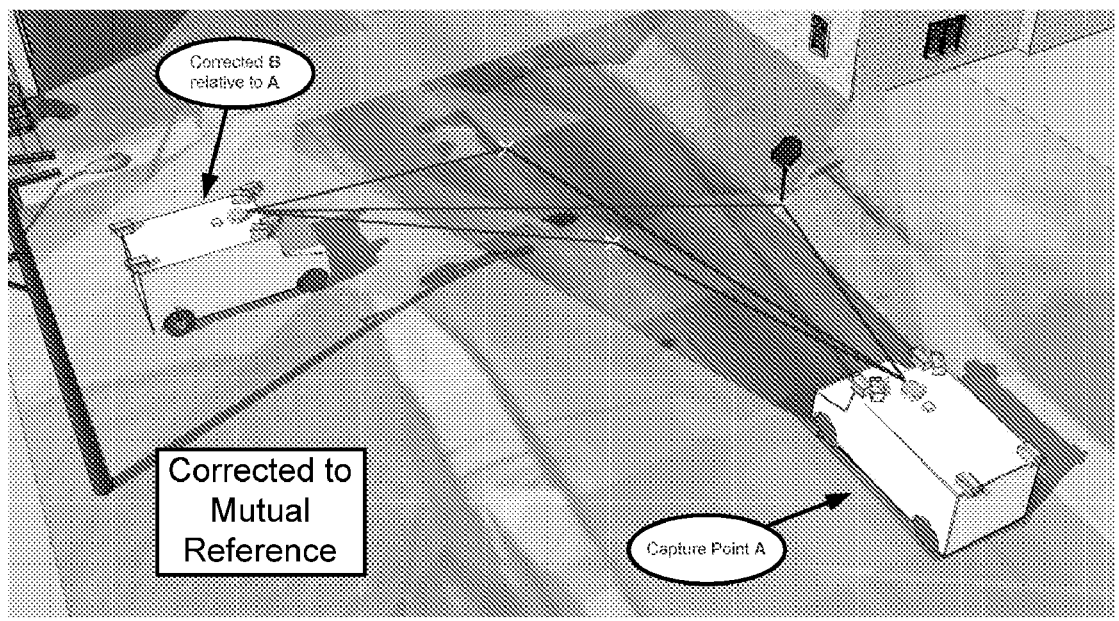
FIG. 15 is a perspective view of the results of a mutual reference correlation.

Finally, in step 228 the position of each of the capture points is recalculated so that its reference points best match the correlation points, see FIG. 15. In the case of three correlation points between capture points, this results in the new capture points being in the same frame of reference. Here we show capture points A and B referencing their mutual correlation points. The correction may be accomplished using reference correction 240, 3 point correction 242, or RMS correction 244. These corrections use the correlation points to correct capture points (lat, long, alt, pith, roll, azimuth) recorded by survey vehicle 10.

Reference correction may be the simplest method, shifting the lat and long of the capture points so that they best match the adjusted correlation points. This method works with a single correlation point between capture points. If more than one exists, either the best (the one weighted the most by both capture points), or an average of the results of several may be used.

For the 3-point method, the relative positions between two capture points may be solved and all six degrees corrected. If more than 3 correlation points are available between capture points, either the best 3 or an average of the results of several combinations may be used. This correction has the advantage of correcting survey vehicle 10 capture point reading in all six degrees of freedom.

RMS is root mean squared and uses 4 or more points together and a weighted average based on distance to find the best corrected location of the capture points relative to each other.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A surveying system for determining the location of an object point from images, said surveying system comprising:
   two image gathering devices coupled at a known relative distance, each said image gathering device adapted to generate an image;
   a global positioning system providing an absolute position of a first capture point; and
   a location calculator, said location calculator having a plurality of instructions enabling said location calculator to correlate at least two reference points appearing on two images obtained with the two image gathering devices at the first capture point with reference points appearing on images obtained at a second capture point to obtain correlated reference points, and to determine the position of the object point based on the correlated reference points and the absolute position of the first capture point.

2. The surveying system of claim 1 further comprising an inertial navigation system, wherein the position of the object point is determined taking into account a direction signal from the inertial navigation system.

3. The surveying system of claim 1, wherein the location calculator determines a first position of a correlated point based on the absolute position of the first capture point and the images obtained at the first capture point, determines a second position of the correlated point based on the absolute position of the second capture point and the images obtained at the second capture point, and determines the position of the object point based on the first position of the correlated point and the second position of the correlated point.

4. In a surveying system, a method of determining the position of an object point, said method comprising the steps of:
   obtaining an absolute position of a first capture point with a global positioning system;
   correlating at least two reference points appearing on two images obtained at the first capture point with reference points appearing in second images obtained at a second capture point to obtain correlated reference points; and
   determining the position of the object point based on the correlated reference points and the absolute position of the first capture point.

5. The method of claim 4 further comprising the step of identifying the two reference points.

6. The method of claim 5 wherein said step of identifying is accomplished by one of manual observation, strip mapping, depth mapping, and ray mapping.

7. The method of claim 4 wherein said step of correlating is accomplished by one of mesh correlation, sequence correlation, and orientation aware weighing.

8. The method of claim 4 further comprising the step of determining the location of a correlation point by weighing the corresponding reference points obtained at the first capture point and at the second capture point based on an error function.

9. The method of claim 8 further comprising the step of using the location of the correlation point to correct the location of the object point.

10. The method of claim 8 wherein said step of determining the location of a correlation point is accomplished by one of ramp averaging and spline averaging.

11. The method of claim 4 wherein said step of determining the position of the object point is accomplished by one of reference correlation, 3 point correlation, and RMS correlation.

12. The method of claim 4, further comprising:
   determining a first position of a correlated point based on the absolute position of the first capture point and the images obtained at the first capture point,
   determining a second position of the correlated point based on the absolute position of the second capture point and the images obtained at the second capture point, and
   determining the position of the object point based on the first position of the correlated point and the second position of the correlated point.

13. A machine-readable program storage device for storing encoded instructions for a method of determining the location of an object point, said method comprising the steps of:
   obtaining an absolute position of a first capture point from a global positioning system;
   obtaining images from two image gathering devices coupled at a known relative distance;
   correlating at least two reference points appearing on two images obtained at the first capture point with reference points appearing on images obtained at a second capture point to obtain correlated reference points; and
   determining the position of the object point based on the correlated reference points and the absolute position of the first capture point.

14. The machine-readable program storage device of claim 13 wherein said method further comprises the step of identifying at least two reference points.

15. The machine-readable program storage device of claim 14 wherein said method has said step of identifying being accomplished by one of strip mapping, depth mapping, and ray mapping.

16. The machine-readable program storage device of claim 13 wherein said method has said step of correlating being accomplished by one of mesh correlation, sequence correlation, and orientation aware weighing.

17. The machine-readable program storage device of claim 13 wherein said method further comprises the step of determining the location of a correlated reference point by weighing the corresponding reference points obtained at the first capture point and at the second capture point based on an error function.

18. The machine-readable program storage device of claim 17 wherein said method includes using the location of the correlation point to correct the location of the object point.

19. The machine-readable program storage device of claim 17 wherein said method includes said step of determining the location of correlation points being accomplished by one of ramp averaging and spline averaging.

20. The machine-readable program storage device of claim 13 wherein said method includes said step of determining the position of the object point being accomplished by one of reference correlation, 3 point correlation, and RMS correlation.

* * * * *